April 13, 1937.  E. R. JONES  2,076,819
CENTER INDICATOR
Filed May 7, 1936
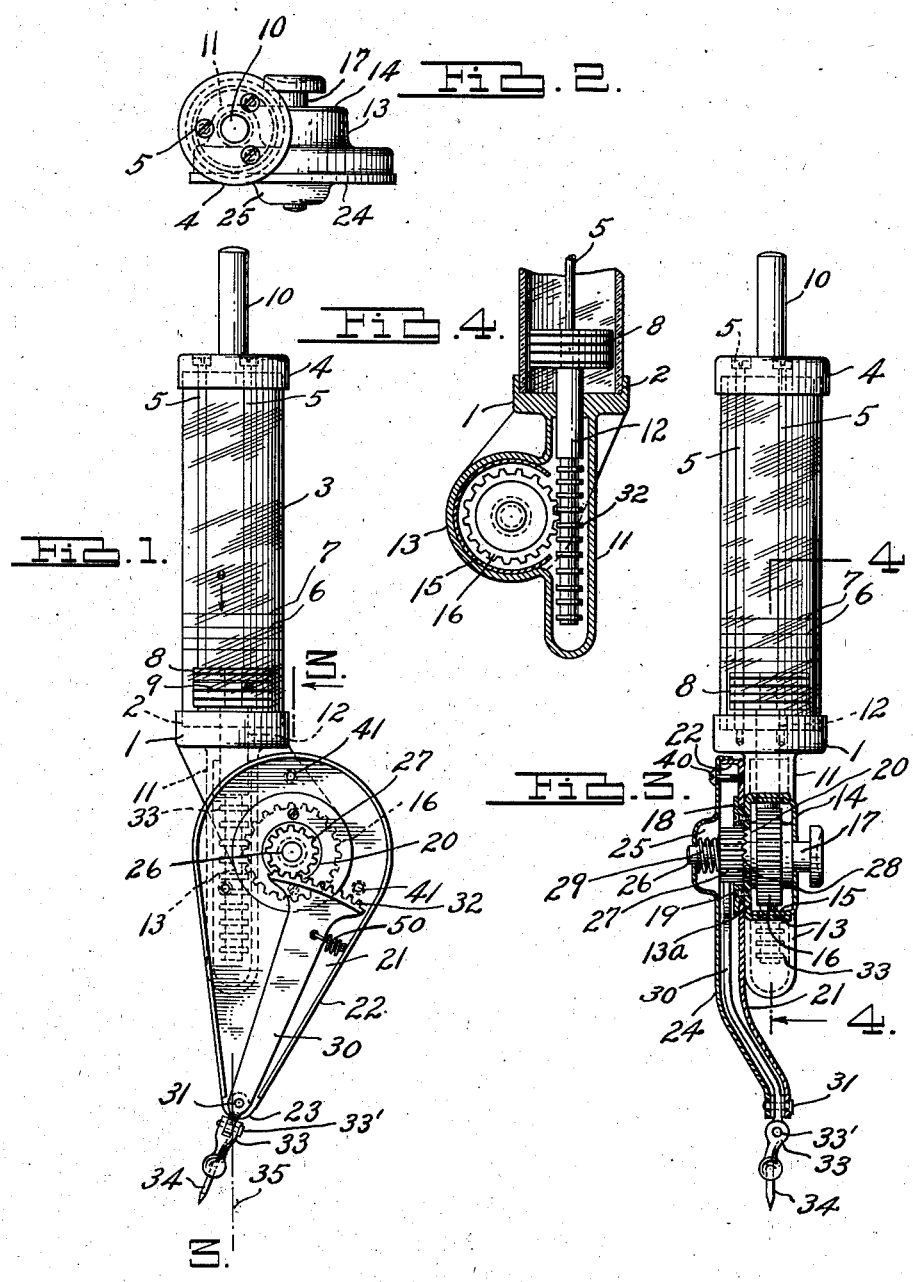
INVENTOR.
Ernest R. Jones
BY
ATTORNEY.

Patented Apr. 13, 1937

2,076,819

UNITED STATES PATENT OFFICE 2,076,819

CENTER INDICATOR

Ernest R. Jones, Detroit, Mich.

Application May 7, 1936, Serial No. 78,442

4 Claims. (Cl. 33—172)

This invention relates to center indicators, the purpose being to provide a device mountable in a tool chuck of a lathe for instance and adapted to align the tool with a point on a piece of work and providing a means to adjust the tool support so that when the tool is positioned therein it may be moved into the work properly centered as to the point of the work to be operated upon.

The object of the invention is to provide a tool having a shank fitting in the tool chuck or support and carrying a pivotally supported pointer that may be positioned on the work at the center point marked thereon and if the point be off the axis of revolution of the shank move a visible indicator to zero position as the tool support is adjusted transversely of the said axis of revolution.

It is further a feature and object of the invention to provide an indicator that is of simple construction and in which a gauge is provided visibly movable relative to the zero point and means between the indicator and a positionable pointer in which movement of the indicator element is a multiple of the movement of the pointer.

A further object is to provide a means in association with the said structural relationship of the parts whereby the pointer may be released from the indicator element to permit adjustment.

These and other objects and various novel features of the invention are hereinafter more fully described and claimed, and the preferred form of construction of a center indicator embodying my invention is shown in the accompanying drawing in which—

Fig. 1 is an elevation of my improved indicator.

Fig. 2 is an end view thereof.

Fig. 3 is an elevation partly in section taken on line 3—3 of Fig. 1.

Fig. 4 is a section taken on line 4—4 of Fig. 3.

The device consists of a preferably cast base member 1 having a recess 2 in the face thereof to receive a glass tube 3. A cap 4 is provided for the upper end of the tube and there are a series of preferably three screws 5 that extend through the cap into the base and in the interior of the tube 3. The exterior face of the tube has preferably a number of lines 6 provided thereon one of which lines as 7, is a zero line as indicated by the naught and arrow in Fig. 1. Within the tube and slidable on these rods is an indicator head 8 which may be of any approved material and on which are also provided certain lines one of which, as 9, may be considered a zero line as indicated by the naught thereon. The cap 4 is provided with a shank 10 which may be introduced into a tool chuck or support of a lathe.

In mounting a piece of work in the work chuck and a tool in the tool chuck it has heretofore been necessary to bring the point of the tool, let us say a drill as an instance and not by way of limitation, to proper relation with the work. The workman adjusts the tool support transversely of the longitudinal axis of the tool. This adjustment is apt to be erroneous to some extent and not readily observable when it is exactly centered in respect to the point at which the work is to be drilled in the instance under discussion.

For the purpose of securing accuracy in positioning the tool in respect to a center point, I provide a means in which there is an element having a zero indication that is movable in respect to the zero indication on the glass tube and when these two lines are in registration the tool chuck is accurately positioned to support the tool and present the same accurately in respect to the center point for the drilling operation. I therefore provide a means for moving the head 8 in the tube 3 in respect to the zero indication thereon.

It is firstly to be understood that the base 1 has a tubular portion 11 extending therebelow on the axis of the tube 3. The base is apertured and a stem 12 is provided which has an end that may be threaded to receive the movable head 8. The stem 12 is inserted through an aperture in the base 1 into the tubular extension 11 and this tubular extension has a cylindrical wall 13 forming a chamber opening to the interior of the tube 11 as will be understood from Fig. 4. This wall 13, as will be understood from Fig. 3, is open in one face to receive a shell 14 fitting tightly within the interior of the wall 13 and the flange 15 of the shell 14 is also open to the interior of the tube 11. The case or shell 14 carries a spur gear 16 mounted on a headed shaft 17 which is rotatably supported at one end in the face wall of the shell 14 as will be understood from Fig. 3. On the face wall 13a of the portion 13 at the side of the tubular member 11 is an undercut washer 18 secured in place by screws 19 threaded into the bottom wall of the recess formed by the member 13.

The face wall 13a is apertured and the gear 16 has a finished side portion 20 which bears against the inside face of the wall 13a about the aperture 20 therein as shown in Fig. 1 and the opposite side of the gear 16 has a like hub surface which is in engagement with the face wall of the member 14.

For the purpose of adjustment, I revolubly secure a sheet metal shell 21 on the side face of the element 13 forming part of the gear casing by means of the flanged plate 18. This member 21 has a general outline as shown in Fig. 1 and has a flange 22 along its peripheral edge which flange is cut away at the point 23 for a purpose hereinafter described. The open side of the member 21 permits the plate 18 to be introduced thereinto and screwed to place by the screws 19 of which there may be several. I also provide a cap plate 24 which is likewise preferably flanged to engage over the flange 22 of the base plate 21 and forms a recess to receive a pointer lever hereinafter described. This cap piece 24 has a recess 25 and an aperture in the recess wall to receive the small end 26 of the shaft 17 and on this reduced end portion 26 is a spur gear 27, the inner side face of which may be radially notched to fit corresponding radial notches in the inner hub of the gear 16. These notches are indicated by the common line 28 in Fig. 3. A spring 29 is positioned on the reduced end portion 26 of the shaft 16 and engages at one end against the wall of the recess 25 and at the other end against the outer face of the gear 27.

As shown by dotted lines in Fig. 1, the reduced diameter portion 26 of the shaft 17 provides a shoulder which fits in a recess in the inner face of the gear 27. The gear 16 is loose on the shaft 17. Thus this shaft may by its headed end be moved to the left from the position in Fig. 3 which will disengage the companion toothed portions of the gear 27 and gear 16 indicated by the line 28 and in order that the cap member 24 will be retained in place against pressure exerted thereon in disengaging the radial toothed portion 27 of the gear from that of the gear 16, the flange of the cap member 24 may be secured in place on the base plate 21 by screws 40, threaded apertures for which are indicated at 41 in Fig. 1.

As before stated, the base plate 21 and cap 24 provide a recess which is of the general shape shown by the outline of the flange 22 of the member 21 shown in Fig. 1. In this space is mounted a lever 30 pivoted at 31 to the tip end 23 of the base plate 21 and its opposite end is formed with a rack gear 32 which meshes with the spur gear 27. This lever 30 has an end portion extending beyond the point 23 of the base member 21 and to this end is attached a pointer holder 33 secured thereto as by a screw 33' as indicated in Fig. 1, the pointer being indicated at 34. Movement of this lever 30 on the pivot point 31 tends to rotate the gears 27 and 16 when in mesh. The lever 30 is spring restrained in one direction by a small coiled spring 50 connected to the lever adjacent the rack end and to a convenient portion of the base plate 21. The spring always tends to turn the gears 27 and 16 to move the rack and indicator connected therewith downwardly away from the zero line to the position shown in Fig. 1.

As heretofore stated, the stem 12 of the indicator member 8 extends into the tubular portion 11 and is there cylindrically grooved or threaded as indicated at 32. The teeth of the spur gear 16 mesh in these grooves like the gear with a rack. The stem 12, however, being fixed to the indicator head 8 and the indicator head 8 riding on at least more than one rod 5, is held from rotation and may be provided with rack teeth on one side only if so desired in view of the fact that the cap element 4 and its shank 10, the tube 3, the base 1 and the supported parts may rotate as a unit about the axis of the tube 3.

When the pointer 34 is off center as is the case shown in Fig. 1, the indicator head 8 is below the zero indicating line 7. A point to which the device is to be adjusted is indicated at 35 simply as a means of indicating the point on a piece of work (not shown) and thus the workman after the mounting of my improved center indicator in the tool support or chuck may bring the pointer 34 to engage the point 35 on the piece of work. This movement of the member 34 turns the lever 30 on its axis 31 thereby rotating the gear 27 and gear 16. This will raise the member 8 and when so set that the zero line 9 of the head 8 coincides with the zero line 7 on the glass tube, the point 35 is directly on the extended axis of the tool shank and tube 3. This device may then be removed from the tool shank and the tool introduced thereinto with perfect assurance that the tool is centered as to the point 35.

The corresponding radial teeth on the gear 16 and gear 27, indicated by the line 28, serve to hold the pointer member in certain relation to the position of the head 8 and as this may require adjustment, upon the assembly of the tool for instance, the gear 27 may be moved to position with its radial teeth out of mesh with those of the gear 16 thus permitting movement of the pointer lever 30 without rotation of the gear 16.

The device is used preferably in the following manner:

The shank 10 is secured in the tool chuck, the point 34 is then moved to position to engage the marked spot 35 on a piece of work which may be an indentation. This is accomplished manually by first moving the point 34 to alignment with the notch and then the tool support moved toward the work to hold the point 34 under pressure contact with the point 35 on the work. The tool chuck may then be rotated, as by hand, and if the point 35 is not on the extended axis of the shank 10, rotation of the device will cause the pointer lever 30 to oscillate on its pivot 31. This rotates the gears 27 and 16 and reciprocates the head 8 in the tube. The tool support is then adjusted transversely of the axis of rotation, either in a vertical or horizontal plane or both, while the device is being rotated, and when the head comes to rest in the tube 3 the point 35 is aligned with the axis of rotation. The tool support is then fastened in the adjusted position and the indicating device removed and the tool introduced therein.

The train of gears, including the rack segment 32, and the gears 27 and 16 are of such relationship as to cause a material movement of the head 8 by a very little eccentricity of the point 35 relative to the axis of rotation of the device.

From the foregoing description, it is believed evident that the various objects and features of my improved center indicator are attained by the construction described; that the device is simple in operation; will reduce the time and labor involved in adjustment of the tool chuck in respect to a point of operation on a piece of work; that it may be properly adjusted to secure extreme accuracy, and that during adjustment of the tool support (not here shown), the operator may with certainty determine when the axial center line of the part 10 and tube 3 pass through the desired point on the work. This is readily visible through the glass tube and by reason of the great distance through which the head 8 is moved for a very small distance through which the pointer 34 may be moved to engage the exact point on the work.

Having thus fully described my invention, what I claim and desire to secure by Letters Patent of the United States is—

1. A center indicator comprising a body adapted to be mounted in a rotating part of a machine tool, a lever pivotally mounted in the body and having a pointed end nearer the point of pivot than the opposite end, an indicator movable relative to the body, a gear train, a rack on the long end of the pivoted lever operatively associated with the gear train whereby oscillation of the lever oscillates said gear train, the gear train being connected with the indicator whereby the indicator is moved to and fro, said body having a graduation relative to which the indicator is movable, means for disassociating the gear train and indicator to permit adjustment of the indicator relative to the graduation, rotation of the body when the pointed end of the lever is stationary at a point eccentric to the axis of rotation causing movement of the indicator member and when the point is held in the extended axis of rotation the indicator is held in stationary position relative to the graduation.

2. A center indicator comprising a body adapted to be mounted in the rotating part of a machine tool, said body having a hollow transparent portion provided with a graduation thereon, an indicator member in the transparent portion, a lever having a pointed end pivotally mounted on the body, said pointed end being nearer the pivot point than the opposite end, a gear train, a rack on said opposite end of the pivoted lever engaging the gear train whereby oscillation of the lever oscillates the gear train, a rack in toothed relation with the gear train and connected with the indicator whereby, through oscillation of the lever, the indicator is reciprocated, a spring tending to turn the lever in one direction on its pivot, rotation of the body while the pointed end of the lever is stationary at a point eccentric to the axis of rotation causing reciprocation of the indicator relative to the graduation and movement of the rotating part of the machine tool transversely of the axis of rotation resulting in cessation of reciprocation of the indicator when the extended axis of rotation passes through the point of the pivoted lever.

3. A center indicator for the purpose described comprising a shank for mounting in a rotatable tool support of a machine in which the support is adjustable transversely in a vertical or a horizontal plane relative to the axis of rotation, a base element, a transparent tube secured between the shank and the base, said tube having a zero indication, a reciprocable indicator member having a rack like extension, a gear train supported by the base and including a gear engaging the rack like extension, a second gear drivingly associated with the first gear where rotation of the second gear may rotate the shaft and reciprocate the rack and indicator, a pivoted lever including a pointer at one end and an arcuate rack like segment at the other engaging the second gear whereby oscillation of the pointer element on its pivot causes an oscillation of the gears and reciprocates the rack and indicator, said pivoted pointer member being turnable about the axis of the said second gear permitting manual positioning of the point of the pointed lever on a predetermined point of a piece of work, rotation of the device, when the pointed end of the lever is held eccentric to the axis of rotation, causing oscillation of the lever and reciprocation of the indicator relative to the zero indication and adjustment of the tool support aligning the axis of rotation with said predetermined point on the work piece.

4. A center indicator for the purpose described comprising a shank for mounting in a rotatable tool support of a machine in which the support is adjustable transversely in a vertical or a horizontal plane relative to the axis of rotation, a base element, a transparent tube secured between the shank and the base, said tube having a zero indication, a reciprocable indicator member having a rack like extension, a gear train supported by the base and including a gear engaging the rack like extension, a second gear drivingly associated with the first gear where rotation of the second gear may rotate the shaft and reciprocate the rack and indicator, means for associating the gears, a pivoted lever including a pointer at one end and an arcuate rack like segment at the other engaging the second gear whereby oscillation of the pointer element on its pivot causes an oscillation of the gears and reciprocates the rack and indicator, said pivoted pointer member being turnable about the axis of the said second gear permitting manual positioning of the point of the pointed lever on a pretermined point of a piece of work rotation of the device, when the pointed end of the lever is held eccentric to the axis of rotation, causing oscillation of the lever and reciprocation of the indicator relative to the zero indication and adjustment of the tool support aligning the axis of rotation with said predetermined point on the work piece.

ERNEST R. JONES.